3,574,012
TRIMETALLIC MASKS AND METHOD
Mortimer Penberg, Claremont, Calif., assignor to Aerojet-General Corporation, El Monte, Calif.
Filed Jan. 6, 1969, Ser. No. 789,291
Int. Cl. B23p 3/20; C23f 1/00
U.S. Cl. 156—3                                                20 Claims

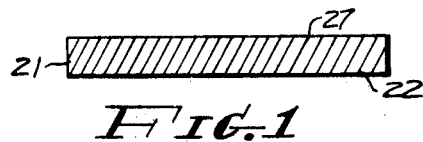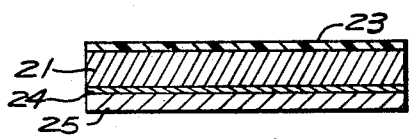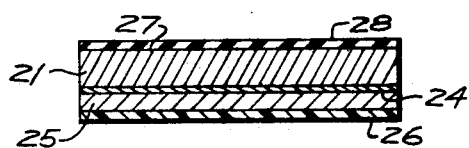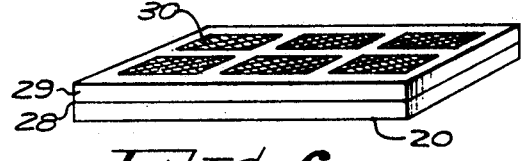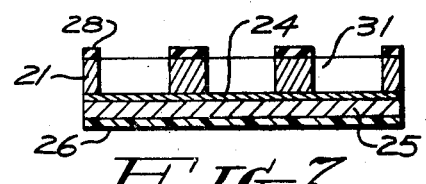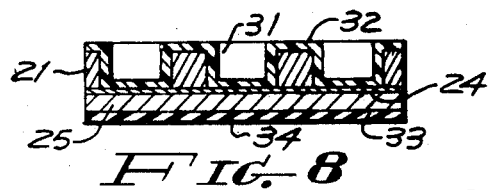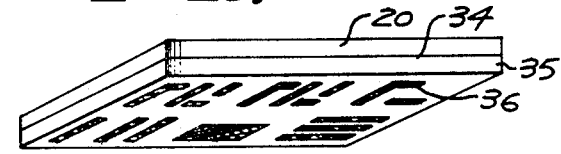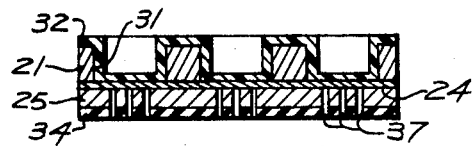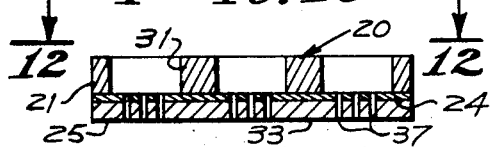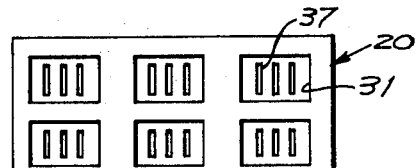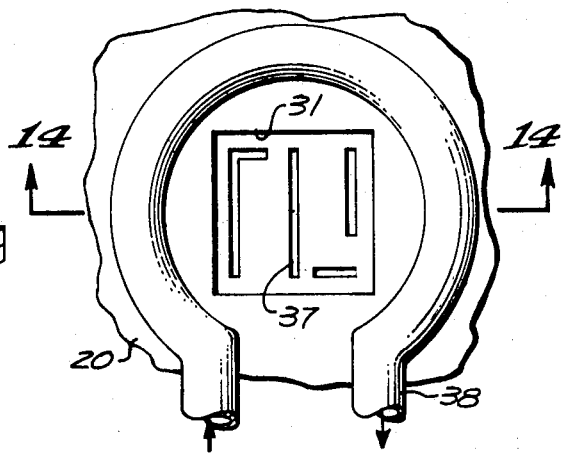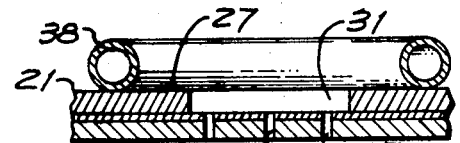
INVENTOR.
MORTIMER PENBERG
BY
ATTORNEY

United States Patent Office 3,574,012
Patented Apr. 6, 1971

ABSTRACT OF THE DISCLOSURE

A trimetallic mask according to this disclosure comprises a base having coarse apertures formed therein. A thin film layer of fine grain metal is bonded to the base by an intermediate thin film of noble metal. Fine apertures are formed in the fine grain layer.

The mask is formed by depositing a thin film of noble metal onto a surface of the base and thereafter depositing a thin film of fine grain metal onto the noble metal layer. Coarse apertures are selectively etched in the base and fine apertures are selectively etched in the fine grain thin film.

---

This invention relates to masks for use in deposition processes for construction of thin film devices, and particularly to trimetallic masks.

Heretofore, masks for use in vapor deposition processes have usually been constructed of single metal plates or of bimetal materials such as nickel and beryllium/copper (1.7% beryllium, 0.25% cobalt, balance copper combination). Single metal masks have not been satisfactory for vacuum deposition processes because the fine apertures should be no deeper than about 1.0 mil. If the fine apertures are deeper than about 1.0 mil, the size of the aperture is difficult to control. Furthermore, it is not possible to construct a "stepped" aperture (one in which the coarse aperture is etched into one surface and the fine aperture is etched into the other) in a single metal mask. The bimetal combinations have not been entirely satisfactory for use in vacuum deposition processes when exposed to intensely heated source materials. Specifically, the different coefficient of expansion for nickel and for beryllium/copper caused the masks to warp or buckle when subjected to intense heat, such as the heat of the vaporized source materials. For example, the coefficient of expansion of nickel is about $15.5 \times 10^{-6}$ cm./cm. ° C. at 0° C. while that for beryllium/copper is about $17.1 \times 10^{-6}$ cm./cm. ° C. at 0° C. Where relatively large masks, for example of the order of about 20 square inches, are utilized to deposit vapor materials onto a substrate, it has been difficult to maintain the mask contiguous to the entire surface of the substrate. Consequently, some of the vapor of the source material could be deposited onto the substrate in the region behind the mask where no deposition is intended to occur, hence producing an unwanted penumbra effect, or shadowing. Hence, deposition films having widths exceeding tolerable limits were formed thereby causing deposition of electrical devices having electrical tolerance variations other than that intended, and causing occasional short circuiting between adjacent circuit devices.

It is an object of the present invention to provide a mask for use in vapor deposition processes, which mask resists warpage or buckling when subjected to intense heat.

Another object of the present invention is to provide a trimetallic mask structure having a mask configuration formed in a thin layer of metallic material which in turn is bonded to a base metal, the base metal forming the supporting structure for the mask.

Another object of the present invention is to provide a method for constructing a trimetallic mask for use in vapor deposition processes.

Another object of the present invention is to provide a trimetallic mask structure wherein fine apertures of the mask are formed through one layer of metallic material which in turn is bonded by means of a noble metal to a base material, the base material having coarse apertures therethrough in fluid communication with the fine apertures.

A mask according to the present invention comprises a base material having a thin film layer of finely grained metallic material bonded thereto by means of a thin film of noble metal. Fine apertures are formed through the layers of metallic material and the noble metal, which fine apertures are arranged in the desired configuration for use in vapor deposition processes. Coarse apertures are formed through the base material in fluid to one or more of the fine apertures so that vapor of source materials may be passed through the coarse and fine apertures to be deposited onto a substrate.

According to one feature of the present invention, a noble metal is deposited onto one surface of the base and thereafter a fine grain metallic material is deposited onto the noble metal. Coarse apertures are formed through the base material to the interface between the base material and the noble metal, and fine apertures are formed through the layer of metallic material and through the noble metal layer to provide communication to the coarse apertures.

According to an optional and desirable feature of the present invention, heat sink means is in contact with one surface of the mask so as to provide a uniform temperature across the mask.

The above and other features of this invention will be more fully understood from the following detailed description and the accompanying drawings, in which:

FIGS. 1–10 illustrate the method of forming a mask in accordance with the presently preferred embodiment of the present invention;

FIG. 11 is a side view elevation in cutaway cross-section of a mask according to the presently preferred embodiment of the present invention;

FIG. 12 is a top view of the mask taken at line 12—12 in FIG. 11;

FIG. 13 is a top view elevation of a mask in accordance with a modification of the present invention; and FIG. 14 is a side view elevation in cutaway cross-section taken at line 14—14 in FIG. 13.

Referring to the drawings, and particularly the FIGS. 1–10, the method of constructing a trimetallic mask for use in vapor deposition processes may be explained. The completed mask 20, constructed in accordance with the present invention, is illustrated in FIGS. 11 and 12. Mask 20 is constructed from a base material 21, such as a sheet of supporting metallic or ceramic material approximately 20 mils thick. It is preferred that the material forming base 21 have a relatively low coefficient of expansion and a high coefficient of thermal conductivity. Suitable examples of material for use for base material 21 includes stainless steel, Invar (36% nickel, balance iron) and Kovar (29% nickel, 17% cobalt, 0.3% manganese, balance iron) and their relative coefficients of expansion and coefficients of thermal conductivity are set forth in Table I.

TABLE I

| Material | Coefficient of thermal expansion, cm./cm.° C. (×10⁻⁶) | Coefficient of thermal conductivity, watts/sq. cm.° C. (×10⁻⁶) |
| --- | --- | --- |
| Stainless steel | 18.5 | 1.055 |
| Kovar | 0.9 | 0.125 |
| Invar | 0.9 | 0.125 |

Surface 22 is initially polished or chem-etched to a high sheen, for example, No. 4 finish. As illustrated in FIG. 2 the remaining portion of base material 21 is covered with a plastic coating 23 to protect the base material during subsequent operations.

A layer of noble metal 24 is deposited onto the polished surface 22 of base material 21 (FIG. 3). Noble metals which may be used for layer 24 include gold, platinum, iridium, rhodium, ruthenium and osmium. By way of example, the thickness of layer 24 may be approximately 200 angstroms. The gold layer may be deposited by vapor deposition, cathode sputtering, or electrolysis deposition. In any case, plastic layer 23 over the other portions of base material 21 serves to protect the base material from having gold deposited thereon. Layer 25 of fine grain metallic material is deposited over gold layer 24 (FIG. 4) and serves as the metallic layer for the mask in which fine apertures of the mask will be formed. By way of example, layer 25 may comprise fine grain nickel deposited to a thickness of between about 0.5 and 1 mil. In any event, the ratio of the thickness of the base to the thickness of layer 25 exceeds about 20 to 1.

As illustrated in FIG. 5, plastic layer 23 is removed after the deposition of layer 25 and layers 24 and 25 are cleaned of rough edges. Subsequently, a plastic protective coating 26 is formed over layer 25. The opposite surface 27 of base material 21 is covered with a photoresistant material 28 such as Kodak KPR–II Photoresist (FIG. 5). Mask 29 which may be constructed of glass, is then placed in contact with photoresist layer 28 (FIG. 6). Mask 29 contains a plurality of exposure areas 30 which represents a coarse pattern for mask 20. By way of example, for positive photoresistant materials, exposure areas are dark areas.

The sandwich structure is next exposed to a lamp to expose the unblocked portions of the photoresistant material, and thereafter a photoresistant developer, such as Kodak KPR–II Developer is used to wash away all photoresistant material 28 blocked by exposure areas 30 of mask 29, thereby leaving exposed portions of surface 27 of base 21. An etchant material such as 42° Bé. Ferric Chloride, commercially available from Southern California Chemical Company, is then applied to the exposed surface 27 of base material 21 to selectively remove all the base material down to the interface with the layer of noble material 24. The selected etchant used for the purposes of this invention, is one which will not dissolve the noble layer 24. Hence, the resultant device, illustrated in FIG. 7, includes a plurality of apertures 31 in the base material 21. As shown in the drawings, all etched surfaces may appear slightly rough due to the nature of the etchant.

Next, the residual photoresistant material 28 and plastic layer 26 are washed from the structure, and a plastic coating 32 is applied to the exposed surface of base material 21 and within apertures 31. Surface 33 of nickel layer 25 is coated with a suitable photoresistant material 34, such as Shipley's AZ 1350 Photoresist (FIG. 8).

Next, a mask 35 containing fine apertures pattern 36 is placed in contact with the surface of photoresistant layer 34 as illustrated in FIG. 9. The unblocked areas of photoresistant material are exposed by a lamp, and a suitable photoresistant developer, such as Shipley's AZ 1350 Developer, is applied to the layer 34 to wash away all photoresistant material 34 exposed by the lamp.

A suitable etchant, such as 42° Bé Ferric Chloride, is then applied to the exposed surface 33 of nickel layer 25 to etch away or remove the nickel layer exposed thereto. The resulting device is illustrated in FIG. 10 and includes apertures 37 formed through the nickel layer 25. In the event that the etchant utilized in forming apertures 37 does not etch through the gold layer 24, the apertures may be further completed by washing mask 20 with suitable gold stripper solution such as Enstrip AU 78, and thereafter with water to remove residual gold which may constrict the apertures. Subsequently, plastic layer 32 and photoresistant layer 34 are washed away from the mask, and the edges of the mask are machined thereby leaving the completed mask illustrated in FIGS. 11 and 12. Mask 20 has a metallic layer 25 such as fine grain nickel bonded to base 21 by means of a noble metal 24. Coarse apertures 31 are formed in the base metal and fine apertures 37 are formed through the metallic layer 25 and noble bonding layer 24.

As an alternative to the method hereinbefore described, the mask illustrated in FIGS. 11 and 12 can be constructed by electroforming the fine grain nickel layer over the noble layer to form the fine apertures. In this case, after the gold layer had been deposited over the polished surface of the base (as illustrated in FIG. 3), a photoresistant material, such as Shipley's AZ 1350 Photoresist, is applied over the gold, and a mask is placed over the photoresistant layer. A lamp exposes those portion of the photoresistant layer which are to be replaced by fine grain metal, and a developer, such as Shipley's AZ 1350 Developer washed away all exposed photoresistant material. The remaining photoresistant material is located only where fine apertures are desired, and fine grain nickel is electroformed over the exposed portions of the gold. The remaining photoresistant material and protective plastic are removed, thereby leaving the mask illustrated in FIGS. 11 and 12.

In the use of the mask thus far described, mask 20 is placed in contact with a substrate (not shown) in a vacuum chamber so that fine apertures 37 are positioned over the substrate. Vapor of a source material (not shown) is then permitted to pass through the coarse apertures 31 and fine apertures 37 so as to be vapor deposited onto the substrate to form the deposited layers of the circuit pattern. Since the base material 21 provides the supporting structure for the nickel layer 25, and since the nickel layer is thin relative to the base 21 and is of fine grain structure, the nickel layer will not expand, but instead will follow the structural expansion and contraction of base material 21 to which it is bonded. Hence, the mask will not buckle due to differences in the coefficients of expansion of the materials utilized in the construction of the mask.

One feature of the present invention resides in the use of a heat sink in connection with the base material so as to provide a uniform temperature across the mask. Hence, in FIGS. 13 and 14 there is illustrated a copper tubing 38 fastened to base material 21 of mask 20, by a clamp (not shown) or other fastening device.

Thermal material, such as heated water, is permitted to flow through tube 38 to dissipate heat away from the hot areas of the mask and provide heat to the cool areas of the mask to maintain a constant temperature over all areas of the mask. The copper tube carrying the coolant, being relatively a good heat conductor aids in conducting the heat. This feature is particularly advantageous in the case of heated substrates wherein it is desirable to maintain the substrate at a relatively high temperature.

The present invention thus provides a method of constructing a mask which is not susceptible to warpage or buckling due to differences of the coefficient of expansion of the materials forming the mask. The mask is particularly useful for instances where vapor deposition over relative large areas is desired. The mask is easy to use and provides accurate and reliable deposition boundaries.

This invention is not to be limited by the embodiments shown in the drawings and described in the description, which are given by way of example and not of limitation, but only in accordance with the scope of the appended claims.

What is claimed is:

1. The method of forming a mask for use in a vapor deposition process which comprises the steps of: depositing a first thin film layer of noble metal onto one surface of a base, depositing a second thin film layer of metal onto the film of noble metal, the metal forming the second film being different from both the noble metal and the metal of the base, selectively etching coarse apertures through the base to the interface between the film of noble metal and the base, selectively etching fine apertures through the metal forming the second film, and removing the portion of the layer of noble metal between the coarse apertures and the fine apertures.

2. The method according to claim 1 wherein the second thin film layer is deposited to a thickness of less than about 1.0 mil.

3. The method according to claim 2 wherein the metal forming the second thin film layer is fine grain metal and wherein the noble metal is selected from the group comprising gold, platinum, iridium, rhodium, ruthenium and osmium.

4. The method according to claim 3 wherein the base metal is selected from the group comprising stainless steel, Kovar and Invar.

5. The method according to claim 1 wherein the metal forming the second thin film layer is fine grain metal.

6. The method according to claim 1 wherein the base metal is selected from the group comprising stainless steel, Kovar and Invar.

7. The method according to claim 1 further including polishing the one surface of the base prior to depositing the thin film layer of noble metal thereon.

8. The method according to claim 1 wherein the ratio of thickness of said base to the thickness of said second layer exceeds about 20 to 1.

9. The method of forming a mask for use in a vapor deposition process which comprises the steps of: depositing a first thin film layer of noble material onto one surface of a base; selectively etching coarse apertures through the base to the interface between the film of noble metal and the base; electroforming a second thin film layer of metal onto the film of noble metal, said second thin film layer of metal having fine apertures selectively formed therein and the metal forming said second film being different from both the noble metal and the metal forming the base; and removing the noble metal from between the coarse apertures and the fine apertures.

10. Tht method according to claim 9 wherein the second thin film layer is deposited to a thickness of less than about 1.0 mil.

11. The method according to claim 9 wherein the metal forming the second thin film layer is fine grain metal and wherein the noble metal is selected from the group comprising gold, platinum, iridium, rhodium, ruthenium and osmium.

12. The method according to claim 9 wherein a photoresistant material is selectively applied to a surface of said noble metal opposite the interface between the noble metal and the base, said second thin film of metal being electroformed onto the surface of said noble metal, and the photoresistant material is thereafter removed, thereby forming said fine apertures.

13. The method according to claim 9 wherein the ratio of thickness of said base to the thickness of said second layer exceeds about 20 to 1.

14. A trimetallic mask for use in vapor deposition processing, said mask comprising: a base constructed of a first metal; a thin film layer of second metal bonded to said base by a thin film layer of noble metal the second metal being different from both the first metal and the noble metal; coarse apertures formed through said base; and fine apertures formed through the layer of second metal and layer of noble metal in fluid communication with respective coarse apertures.

15. Apparatus according to claim 14 wherein the thickness of the layer of second metal is less than about 1.0 mil.

16. Apparatus according to claim 14 wherein the metal forming the second thin film layer is fine grain metal and wherein the noble metal is selected from the group comprising gold, platinum, iridium, rhodium, ruthenium and osmium.

17. Apparatus according to claim 14 wherein said first metal is selected from the group comprising stainless steel, Kovar and Invar.

18. Apparatus according to claim 14 further including heat sink means mounted to said base.

19. Apparatus according to claim 18 wherein said heat sink means comprises a tube mounted to the base and encompassing a portion of said coarse aperture, and coolant means flowing in said tube.

20. Apparatus according to claim 14 wherein the ratio of thickness of said base to the thickness of said film of second metal exceeds about 20 to 1.

References Cited

UNITED STATES PATENTS

JOHN T. GOOLKASIAN, Primary Examiner

| | | | |
|---|---|---|---|
| 2,469,689 | 5/1949 | Gresham | 156—11X |
| 3,192,136 | 6/1965 | Reid | 156—3X |
| 3,423,261 | 1/1969 | Frantzen | 156—18X |

J. C. GIL, Assistant Examiner

U.S. Cl. X.R.

29—191.4; 156—8, 11, 18